Oct. 16, 1956  J. C. SLOAN, JR  2,767,060
PROCESS FOR COOLING LIQUID SULFUR
Filed April 29, 1953
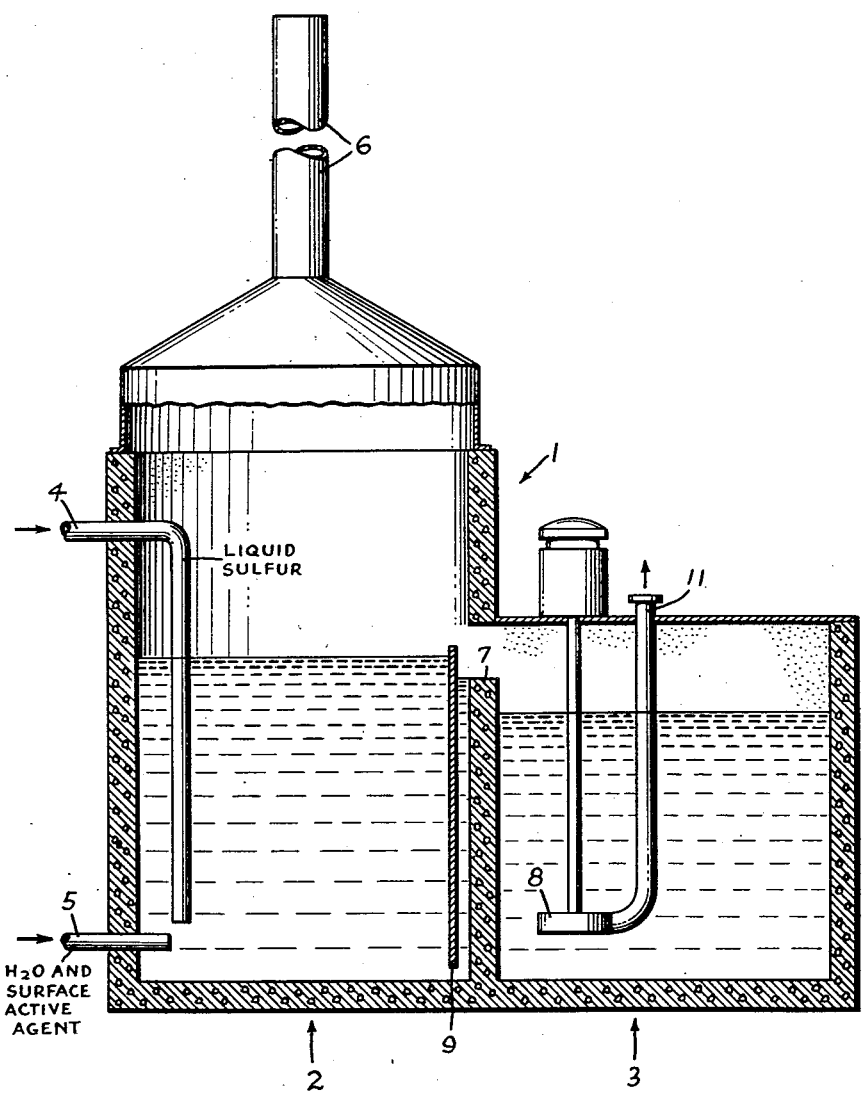
INVENTOR.
JOHN C. SLOAN
BY Ernest A. Polin
ATTORNEY.

United States Patent Office 2,767,060
Patented Oct. 16, 1956

2,767,060

PROCESS FOR COOLING LIQUID SULFUR

John C. Sloan, Jr., Neptune, N. J., assignor to Allied Chemical & Dye Corporation, New York, N. Y., a corporation of Delaware Application April 29, 1953, Serial No. 351,861

5 Claims. (Cl. 23—224)

This invention relates to processes for cooling liquid sulfur. More particularly, this invention relates to an improved process for cooling circulating liquid sulfur by direct addition of water thereto.

When sulfur is produced from chemicals such as gaseous sulfides, hot gaseous reaction products containing elemental sulfur may conveniently be contacted with liquid sulfur to condense and extract produced sulfur. It then becomes advisable or necessary to cool the total liquid sulfur prior to recovery of the elemental sulfur product or to recirculation of liquid sulfur into contact with gaseous reaction products, or both. Other instances occur where there is circulation of liquid sulfur to and from a heat producing and cooling unit, as in production of sulfur dioxide by controlled combustion of liquid sulfur. In effecting circulation of the liquid sulfur, centrifugal pumps have found universal use, due to their relatively low cost and high efficiency.

As the temperature of liquid sulfur is raised, it goes through several changes in viscosity. Between about 245° F., the melting point of sulfur, and about 325° F., the sulfur is fluid and easily handled by conventional centrifugal pumping equipment. However, at the latter approximate temperature and up to about 550° F., the sulfur is viscous and cannot be pumped satisfactorily. From about 550° F., the upper limit of the viscous range, to about 835° F., the boiling point of sulfur, the sulfur once more becomes free flowing.

When handling circulating liquid sulfur, it is highly desirable to cool the sulfur to temperature within the lower fluid range of sulfur. In the past circulating liquid sulfur has generally been cooled by indirect cooling methods, for example, in shell and tube condensers. Sometimes, however, due to limited water supplies, such methods are not entirely satisfactory. Thus, it has been suggested to cool circulating liquid sulfur by direct addition of water to take advantage of the direct liquid-to-liquid contact and of the heat absorption resulting from vaporization of the water. However, it has been found that such method, particularly when it is desired to cool the liquid sulfur to temperature within the lower fluid range of sulfur, tends to result in incomplete removal of injected cooling water and subsequent centrifugal pump failure due to vapor lock (cavitation). When the water is added to the sulfur pool, agitation, mechanically induced or resulting from the boiling action of the water, results in a stable water-sulfur combination containing small quantities of water which are not vaporized at desired cooled sulfur temperatures, especially within the lower fluid range of sulfur. However, upon being subjected to pressure drops encountered within centrifugal pumps, such water vaporizes and causes cavitation of the pumps with resultant decreased pump efficiency and even pumping failure.

Whenever a stable water-sulfur combination occurs within a circulating liquid sulfur system as result of cooling such sulfur by direct addition of water, I have found that cavitation of centrifugal pumps may be prevented by the addition to the circulating sulfur of a water-soluble surface active agent which reduces the interfacial tension of water and liquid sulfur and is substantially inert to the liquid sulfur, i. e. at the temperatures obtaining.

In accordance with one particular mode of carrying out the invention, one or more streams of circulating liquid sulfur to be cooled are admitted to a pool of the same, the pool being maintained by cooling at desired temperature, as within the lower fluid range of sulfur. Cooling is effected by direct contact with water, introduced beneath the pool surface, or introduced from above and impinged directly upon the top surface of the pool. A water-soluble surface active agent which reduces the interfacial tension of water and liquid sulfur and is substantially inert to the liquid sulfur is added to the circulating liquid sulfur. Cooled sulfur at desired temperature is pumped from the pool by means of a centrifugal pump for use as heat exchange or other desired process medium whereby it becomes heated by absorption of heat.

Suitable surface active agent may be added at any stage of the cooling procedure, for example, it may be added to the pool of sulfur before, after, or together with the circulating sulfur to be cooled. If the hot sulfur to be cooled is at temperature substantially above the upper limit of the lower fluid range of sulfur, for example, at temperature of about 600° to 750° F., as is the case when the sulfur is used as a source of sulfur dioxide by its combustion and is circulated through a pool wherein combustion takes place for the purpose of regulating combustion temperature, it is preferred that addition of the surface active agent be after the sulfur has been cooled to temperature within the lower fluid range of sulfur. A convenient manner of adding the agent involves introducing it with the cooling water in the form of an aqueous solution. Another method involves simply adding the agent from above directly into the sulfur pool.

While water-soluble alkyl aryl alkali metal sulfonates have been found to be particularly efficient surface active agents in practicing the invention, other water-soluble surface active agents which reduce the interfacial tension of water and liquid sulfur and which are substantially inert to the liquid sulfur may also be used. These agents may be water-soluble anionic, cationic or non-ionic compounds and may be diluted with inactive substituents, for example, inorganic salts.

Examples of water-soluble anionic surface active agents are: alkyl benzene sulfonates, such as sodium dodecyl-, keryl-, or tridecyl-benzene sulfonates; alkyl diphenyl sulfonates, such as sodium butyl diphenyl sulfonates; alkyl naphthalene sulfonates, such as sodium di-isopropyl naphthalene sulfonate, ammonium diamyl naphthalene sulfonate, sodium mono-nonyl naphthalene sulfonate, sodium isopropyl isobutyl naphthalene sulfonate and sodium dinonyl naphthalene sulfonate; soaps, such as potassium palmitate, triethanolamine oleate, morpholine stearate, sodium laurate and ammonium myristate; sulfated aliphatic alcohols, such as sodium hexadecyl sulfate, sodium oleyl sulfate, triethanolamine dodecyl sulfate, sodium 3-9-diethyl 6-tridecanol sulfate, sodium 2-methyl 7-ethyl 4-undecanol sulfate and sodium 2-ethyl 1-hexanol sulfate; sulfated and sulfonated fatty oils, acids or esters, such as the sodium salt of sulfonated castor oil, the sodium salt of sulfated red oil, the sodium salt of sulfonated butyl oleate and the sodium salt of sulfonated isopropyl oleate; alkyl sulfo phthalates, such as sodium hexadecyl sulfo phthalate; sulfated amides, such as sulfated hydroxy-ethyl lauramide and sulfated hydroxy-isopropyl palmitamide; sodium salt of lauryl sulfo acetate; sodium salt of dioctyl sulfo-succinate; sodium salt of oleyl methyl tauride; sodium salt of sulfonated dodecyl benzoate, and the like.

Examples of water-soluble cationic surface active agents are: salts of primary, secondary and tertiary amines, such as oleyl amine acetate, dodecyl amine acetate, dioctyl amine lactate, stearoyldiethanolamine acetate and dilauroyl triethylene-tetramine diacetate; and quaternary salts, such as lauryl pyridinium bromide, octodecyl ethyl morpholinium chloride, lauroyl-oxyethyl di-(hydroxy ethyl) ethyl ammonium ethyl sulfate, oleyloxy-ethyl trimethyl ammonium ethyl sulfate, dodecyl trimethyl ammonium chloride, and the like.

Examples of water-soluble non-ionic surface active agents are: partial esters of polyhydric alcohols, such as nonaethylene glycol monolaurate and tricosaethylene glycol monolaurate; condensation products of alkyl phenols with ethylene oxide such as the reaction product of isooctyl phenol with 12 ethylene oxide units; condensation products of alkyl thiophenols with 10 to 15 ethylene oxide units; condensation products of higher fatty alcohols with ethylene oxide such as the reaction products of oleyl alcohol with 10 to 15 or more ethylene oxide units; ethylene oxide addends of monoesters of hexahydric alcohols and inner ethers thereof, such as sorbitan monolaurate, sorbitol monooleate and mannitan monopalmitate, and the like.

The quantity of surface active agent which is required to prevent cavitation of conventional centrifugal pumps varies with the specific operating conditions employed as well as the efficiency of the pump, and may be determined by simple routine experimentation for each particular design. In any case the effective quantity need only be a fraction of a percent of the weight of circulating liquid sulfur to be cooled. Addition of substantially greater amounts of the agent serves no added function and is limited by practical and economic considerations. Generally, I have found that the addition of as little as about 1 part by weight of surface active agent (100% active basis) for every 4,000,000 parts by weight of circulating liquid sulfur to be cooled is sufficient to prevent pump cavitation.

A concrete embodiment of the invention adapted to cool sulfur by direct addition of water is represented by the accompanying drawing which is a diagrammatic sectional elevational view of a typical cooling apparatus for liquid sulfur.

Referring to the drawing, the cooling apparatus designated as 1 is constructed of any suitable material such as concrete. The apparatus is divided into two compartments, a cooling pit 2 and a retention and pump pit 3. Circulating liquid sulfur to be cooled, which may be one or more streams of sulfur in its lower and upper fluid ranges, is introduced into cooling pit 2 through line 4 and forms a pool therein. Water is introduced beneath the surface of the sulfur pool in pit 2, preferably adjacent the bottom of the pool, through line 5 together with a water-soluble surface active agent which reduces the interfacial tension of water and liquid sulfur and is substantially inert to the liquid sulfur. If desired, mechanical agitation is provided in pit 2 by means of a stirrer or live steam lance (not shown in the drawing). The water is introduced at sufficient rate to cool the pool to desired temperature, as within the lower fluid range of sulfur, preferably to a temperature of about 250° to 280° F. Steam, produced by the addition of water to the liquid sulfur, is released from the cooling vessel through pipe 6.

Although it is preferred that the circulating liquid sulfur be introduced beneath the surface of the sulfur pool, surface addition may also be employed. Further, if desired, the cooling water may be introduced from above and impinged directly upon the top surface of the sulfur pool in pit 2. Also, if desired, the surface active agent may simply be dumped into the sulfur pool from above.

A portion of the cooled liquid sulfur overflows weir 7 and enters pit 3 which is supplied with a conventional centrifugal pump 8. Behind weir 7 is provided a baffle 9 which extends from a point above the weir to a point near the bottom of pit 3. Baffle 9 serves to hold any water which may rise to the top of the pool and thus prevents its transfer to pit 3. The cooled sulfur is then removed from pit 3 by means of a pump 8 through line 11.

The invention will be further illustrated by the following specific example:

*Example*

A pool of liquid sulfur about 7 feet deep and containing about 1600 gallons of sulfur was maintained in a tank at a temperature of about 260° F. A mixture of two streams of circulating liquid sulfur, one having a temperature of about 630° F. and the other a temperature of about 305° F. was admitted beneath the surface of the pool at the rate of 240 gallons (3600 pounds) per minute. The calculated "mix" temperature of the streams was about 330° F. Water was introduced beneath the surface of the pool at the rate of 6.9 gallons per minute. "Nacconol DB" (a commercial water-soluble surface active agent which comprises (1) as active ingredient 40% of a mixture of alkyl benzene sodium sulfonates, the alkyl radicals of which contain from 12 to 16 carbon atoms, (2) about 40% sodium sulfate and (3) about 20% sodium chloride) was added to the sulfur pool at the rate of about 0.00236 pound per minute. This rate of addition was accomplished by introducing about 0.566 pound of the surface active agent at about 4 hour intervals. The quantity of surface active agent added, on 100% active basis, amounted to about 1.05 parts for every 4,000,000 parts of circulating liquid sulfur. Steam exited the top of the pool substantially free of entrained sulfur or foam. Cooled sulfur at a temperature of about 260° F. was withdrawn from the pool adjacent its bottom by means of a conventional centrifugal pump at about 240 gallons per minute and was substantially free of suspended solid or water. No cavitation of the pump resulted.

If addition of the surface active agent to the cooling pool of sulfur were discontinued, the pump would become partially or totally vapor bound, as evidenced by decreased flow or cessation of flow of discharged cooled sulfur, by decreased power consumption of the pump motor, or both.

While preferred embodiments of the invention have been described, it is understood that these are given to illustrate the fundamental principles involved, and not as limiting the scope of the invention to the particular embodiments illustrated.

I claim:

1. A process for cooling a pool of liquid sulfur containing circulating liquid sulfur to temperature within the lower fluid range of sulfur which comprises introducing water directly to said pool at sufficient rate to cool said pool to the desired temperature, adding to the pool a water-soluble alkyl aryl alkali metal sulfonate surface active agent, and withdrawing the cooled circulating liquid sulfur from said pool by means of a centrifugal pump.

2. A process for cooling circulating liquid sulfur contained in a pool to temperature of about 250° to 280° F. which comprises introducing water below the surface of said pool at sufficient rate to cool said pool to the desired temperature, adding to the pool a water-soluble surface active agent containing as active ingredient a mixture of alkyl benzene sodium sulfonates, the alkyl groups of which contain from 12 to 16 carbon atoms, said surface active agent being added in amount of at least 1 part by weight, on 100% active basis, for every 4,000,000 parts by weight of circulating liquid sulfur, and withdrawing the cooled circulating liquid sulfur from said pool by means of a centrifugal pump.

3. A process for cooling a pool of liquid sulfur containing circulating liquid sulfur to temperature within the lower fluid range of sulfur which comprises introducing water directly to said pool at sufficient rate to cool said pool to the desired temperature, adding to the pool a water-soluble alkyl aryl sulfonate surface active agent, and withdrawing the cooled circulating liquid sulfur from said pool by means of a centrifugal pump.

4. A process for cooling a pool of liquid sulfur containing circulating liquid sulfur to a temperature of about 250° to 280° F. which comprises introducing water directly to said pool at sufficient rate to cool said pool to the desired temperature, adding to the pool a water-soluble alkyl aryl alkali metal sulfonate surface active agent, and withdrawing the cooled circulating liquid sulfur from said pool by means of a centrifugal pump.

5. A process for cooling a pool of liquid sulfur containing circulating liquid sulfur to temperature of about 250° to 280° F. which comprises introducing water directly to said pool at sufficient rate to cool said pool to the desired temperature, adding to the pool a water-soluble surface active agent containing as active ingredient a mixture of alkyl benzene sodium sulfonates, the alkyl groups of which contain from 12 to 16 carbon atoms, and withdrawing the cooled circulating liquid sulfur from said pool by means of a centrifugal pump.

References Cited in the file of this patent
UNITED STATES PATENTS

| | | |
|---|---|---|
| 2,348,736 | Heath | May 16, 1944 |
| 2,632,691 | Blanchet | Mar. 24, 1953 |

OTHER REFERENCES

Schwartz and Perry: "Surface Active Agents"; Book published in 1949 by Interscience Publishers Inc., New York, page 126.